United States Patent [19]

Chen

[11] Patent Number: 5,058,859
[45] Date of Patent: Oct. 22, 1991

[54] SCREW-JOINT TYPE PNEUMATIC TOOL CONNECTOR

[76] Inventor: Chuen-Nan Chen, No. 34, Lane 666, Chung Shan Road, Sec. 2, Changhua, Taiwan

[21] Appl. No.: 518,474

[22] Filed: May 3, 1990

[51] Int. Cl.$^5$ ............................................. F16L 15/04
[52] U.S. Cl. ................... 251/149.4; 285/317; 285/354
[58] Field of Search .............. 251/149.1, 149.4, 149.5; 285/317, 354

[56] References Cited

U.S. PATENT DOCUMENTS

| | | | |
|---|---|---|---|
| 2,337,096 | 12/1943 | Geiger | 251/149.4 |
| 2,842,381 | 7/1958 | Franck | 284/18 |
| 4,493,475 | 1/1985 | Baird | 251/149.1 |
| 4,699,356 | 10/1987 | Margrove et al. | 251/149.6 |

FOREIGN PATENT DOCUMENTS 175922 7/1961 Sweden ............................ 251/149.1

Primary Examiner—Martin P. Schwadron
Assistant Examiner—Kevin Lee
Attorney, Agent, or Firm—Bacon & Thomas

[57] ABSTRACT

A screw-joint type pneumatic tool connector, which comprises an air inlet coupling having received therein a conical spring and a valve, a lock nut connected to the front end of said air inlet coupling by means of screw joint, a stepped control bush having a C-shaped retainer ring externally mounted thereon and being connected to the rear end of the air inlet coupling with a seal ring set therebetween, a socket sleeved on the control bush with an air outlet coupling secured thereto at its rear end by means of screw joint. By means of moving the air outlet coupling inward inside the socket, the valve is moved away from the seal ring to form an air passage for the passing therethrough of compressed air to drive a tool to operate.

2 Claims, 2 Drawing Sheets

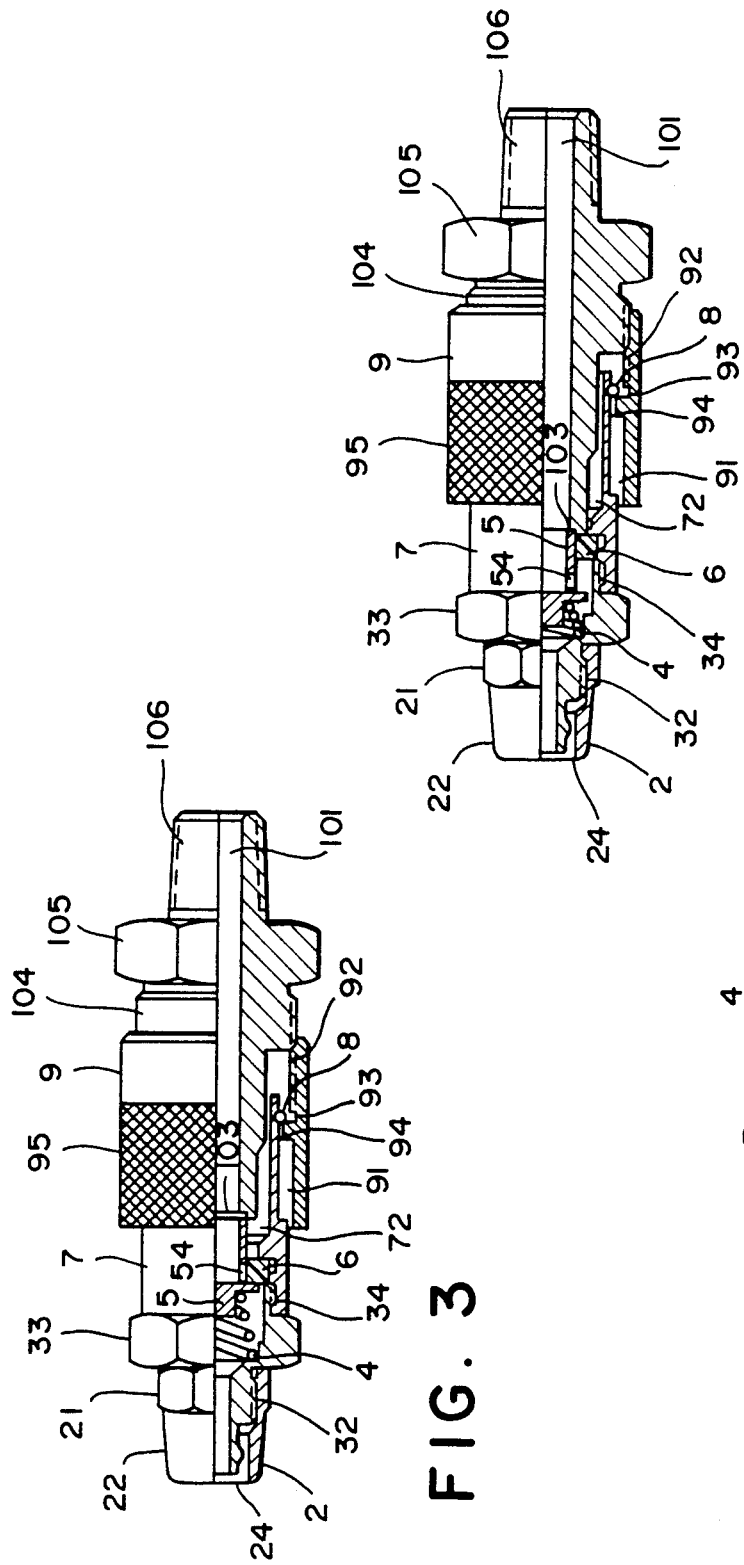
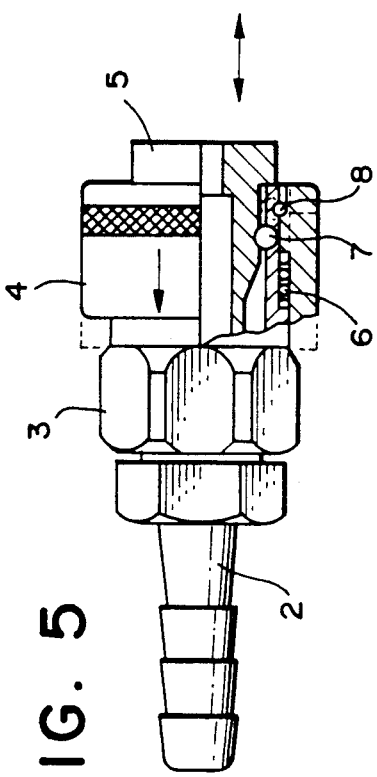
FIG. 3
FIG. 4
FIG. 5

SCREW-JOINT TYPE PNEUMATIC TOOL CONNECTOR

BACKGROUND OF THE INVENTION

1. Field of Invention

The present invention is related to connectors and more particularly to a screw-joint type pneumatic tool connector.

2. Description of the Prior Art

In the use of a pneumatic equipment, a connector is commonly used to connect a tool to the air outlet pipe of a pneumatic compressor so that compressed air can be guided to drive a tool to operate.

FIG. 5 illustrates a structure of pneumatic tool connector according to the prior art, which is generally comprised of a pipe coupling 2, a socket 3, a control ring 4, a tool adapter 5, a compression spring 6, a plurality of steel balls 7, and a C-shaped retainer ring 8. The C-shaped retainer ring 8 is externally mounted on the socket 3 to retain the control ring 4 to the socket 3. The socket 3 has a plurality of round holes for the setting therein of the steel balls 7 respectively, which steel balls 7 are squeezed inside the control ring 4. The compression spring 6 is mounted on the socket 3 inside the control ring 4. The pipe coupling 2 is secured to the rear end of the socket 3 by means of screw joint. After the tool adapter 5 is coupled with a pneumatic tool, the control ring 4 must be pushed backward permitting the steel balls 7 to partly protrude beyond the round holes on the socket 3 so that the tool adapter 5 can be inserted in the socket 3. As soon as the tool adapter 5 is inserted in the socket 3, push force is immediately released from the control ring 4 permitting the compression spring 6 to push the control ring 4 to move back to original position. Therefore, the steel balls 7 are forced by the control ring 4 to respectively set in a circular groove on the outer wall of the tool adapter 5 and the tool adapter 5 becomes firmly retained to the connector. One disadvantage of this structure of pneumatic tool connector is that the tool adapter 5 can not be stably retained by the steel balls 7 and air leakage problem may happen frequently. Another disadvantage of this structure of pneumatic tool connector is that the parts of the connector are easy to wear off due to the unstable connection between the steel balls 7 and the tool adapter 5.

SUMMARY OF THE INVENTION

The present invention has been accomplished under the circumstances in view. It is an object of the present invention to provide a pneumatic tool connector which can eliminate the problem of air leakage.

Another object of the present invention is to provide a pneumatic tool connector which is durable in use.

According to one aspect of the present invention, the air outlet coupling of the pneumatic tool connector is secured to the socket by means of screw joint for holding a pneumatic tool so that it can be conveniently axially screwed in and out for controlling a valve which controls an air passage way for the passing therethrough of compressed air to drive a pneumatic tool to operate.

According to another aspect of the present invention, the air inlet coupling of the pneumatic tool connector is connected to an air outlet pipe of a pneumatic compressor with a lock nut mounted thereon by means of screw joint to firmly secure such an air outlet pipe to the air outlet coupling.

According to still another aspect of the present invention, the control bush of the pneumatic tool connector is secured in the socket by means of a C-shaped retainer ring with a seal ring set therein to protect against air leakage.

According to a further aspect of the present invention, the outlet coupling of the pneumatic tool connector has an outer thread portion for fastening in the socket by means of screw joint, Which outer thread portion is designed in such a size that the outlet coupling can be flexibly screwed inside the socket to tightly stop against the seal ring according to the shape change of the seal ring.

Other objects and aspects together with a fuller understanding of the present invention will become apparent and appreciated by referring to the following description and claims taken in conjunction with the accompanying drawings.

BRIEF DESCRIPTION OF THE DRAWINGS

The foregoing and other objects, features and advantages of the present invention will be best understood from the following description, the appended claims and the accompanying drawings in which:

FIG. 3 illustrates the structure of the present invention under air tight condition;

FIG. 4 illustrates the structure of the present invention under a condition in which the passage of the connector is opened;

FIG. 5 is a schematic drawing illustrating the structure of a pneumatic tool connector according to the prior art.

DETAILED DESCRIPTION OF THE PREFERRED EMBODIMENT

Figures 1, 2:
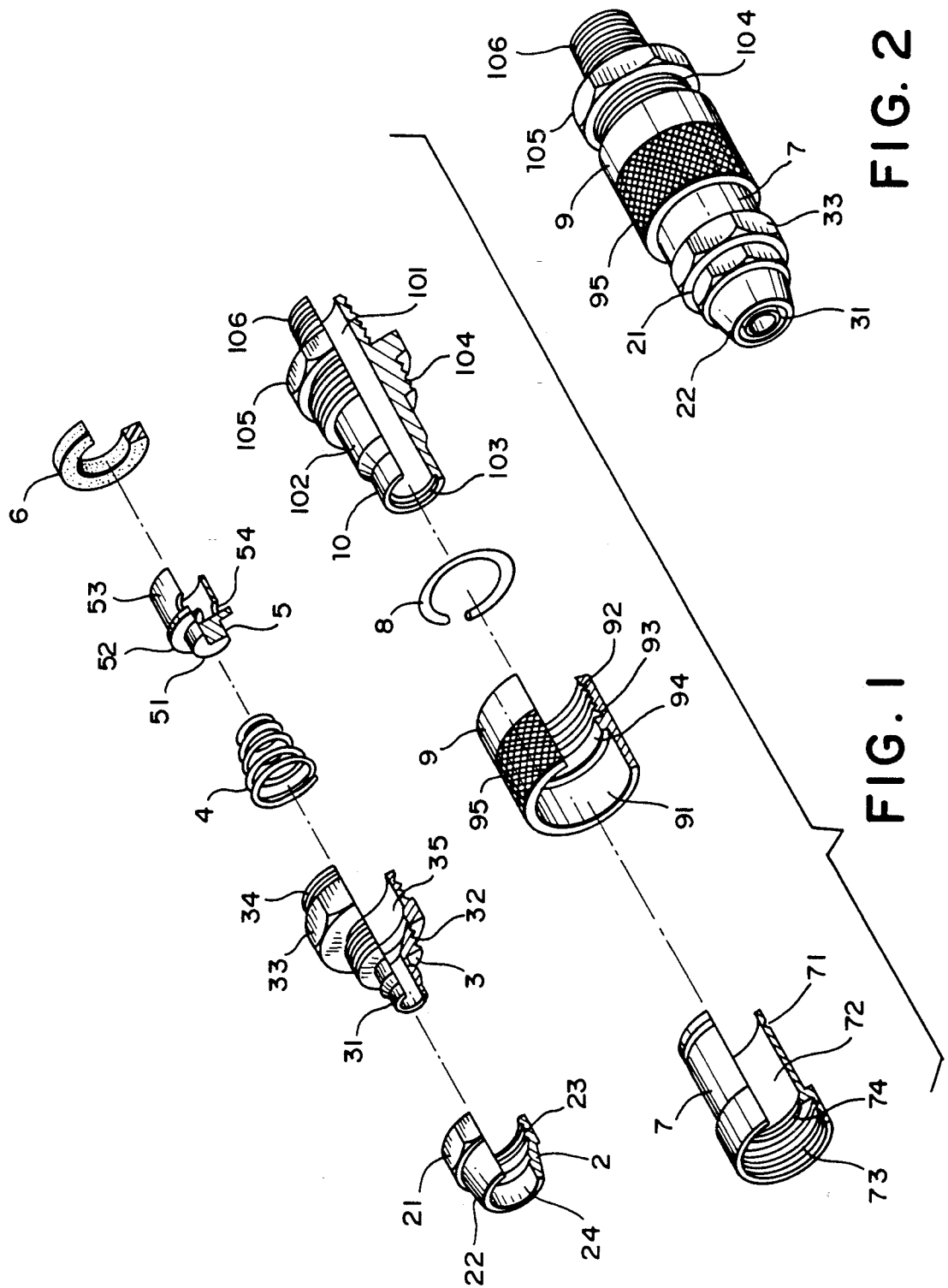
FIG. 1 is a perspective exploded view of the present invention.
FIG. 2 is a perspective assembly view thereof.

Turning now to the annexed drawings in greater detail and referring first to FIGS. 1 and 2, therein illustrated is a pneumatic tool connector embodying the present invention and generally comprised of a lock nut 2, an air inlet coupling 3, a conical spring 4, a valve 5, a seal ring 6, a control bush 7, a C-shaped retainer ring 8, a socket 9 and an air outlet coupling 10. The lock nut 2 comprises a hexagonal body 21 having a conical portion 22 extending therefrom at its one end defining therein a round hole 24 through its central axis and an inner thread portion 23 on its inner wall surface. The air inlet coupling 3 comprises a stepped connecting end 31 at the front, a front outer thread portion 32 for the connection thereto of the inner thread 23 of the lock nut 2, a hexagonal body 33 and a rear outer thread portion 34, and defines therein a hole 35 for receiving the conical spring 4. The conical spring 4 is received in the hole 35 of the air inlet coupling 3 with its bigger diameter portion disposed toward the stepped connecting end 31. The valve 5 comprises an unitary front axle 51 for holding the conical spring 4, an unitary, ring-shaped projection 52 on its outer wall surface, and a hollow valve body 53 which has a plurality of through-holes 54 around its periphery. The seal ring 6 is set to block up the through-holes 54 of the valve 5. The control bush 7 is a stepped tube having a circular groove 71 on the outer surface of its smaller end, a boring bore 72 through the central axis of its smaller end, an inner thread portion 73 on the inner wall surface of its larger end and a round hole 74 through the central axis of its larger end and in communication with the boring bore 72 of its smaller end. The C-shaped retainer ring 8 is fastened in the circular groove 71 of the control bush 7. The socket 9 comprises an embossed outer surface portion 95 and defines therein in proper order a front round hole 91, an intermediate round hole 94 in reduced inner diameter, a circular groove 93 and an inner thread portion 92. The air outlet coupling 10 which defines an air passage 101 through its central axis comprises in proper order a stepped, tubular front end 102 having a recessed portion 103 on its inner wall surface at the front, a front outer thread portion 104, a hexagonal body 105 and a rear outer thread portion 106.

Referring to FIG. 3, after the control bush 7 is inserted through the front round hole 91 of the socket 9 the C-shaped retainer ring 8 is fastened in the circular groove 71 of the control bush 7 and then the control bush 7 is pushed backward permitting the C-shaped retainer ring 8 to be set in the circular groove 93 of the socket 9 before the intermediate round hole 94. The seal ring 6 is placed inside the inner thread portion 73 of the control bush 7. After the conical spring 4 and the valve 5 are fastened in the air inlet coupling 3 the control bush 7 is connected to the air inlet coupling 3 with its inner thread portion 73 firmly screwed up with the rear thread portion 34 of the air inlet coupling 3 permitting the seal ring 6 to be squeezed in the round hole 74 of the control bush 7. Under this condition, the conical spring 4 forces the valve 5 to move inside the seal ring 6 so that the through-holes 54 of the valve 5 are blocked up by the seal ring 6. The lock nut 2 is then connected to the air inlet coupling 3 with its inner thread portion 23 screwed up with the front outer thread portion 32 of the air inlet coupling 3, and the air outlet coupling 10 is connected to the socket 9 with its front outer thread portion 104 screwed up with the inner thread portion 92 of the socket 9.

Referring to FIG. 4, when the front outer thread portion 104 of the air outlet coupling 10 is further screwed inward with the inner thread portion 92 of the socket 9, the recessed portion 103 of the air outlet coupling 10 immediately pushes the valve 5 to move away from the seal ring 6 and the front end of the air outlet coupling 10 stops against the side wall surface of the seal ring 6 permitting compressed air which comes from the air inlet coupling 3 to flow into the valve body 53 from the through-holes 54 of the valve 5 and to further pass through the air passage 101 of the air outlet coupling 10 for driving a tool. Through the aforesaid structure, compressed air is completely utilized to drive a tool and possible air leakage problem is eliminated.

I claim:

1. A screw-joint type pneumatic tool connector, comprising:

an air inlet coupling having received therein a conical spring and a valve, said valve having a plurality of through-holes around its periphery;

a lock nut connected to the front end of said air inlet coupling by means of screw joint;

a stepped control bush having a circular groove on its outer wall at its rear end for the fastening therein of a C-shaped retainer ring, said stepped control bush being connected to the rear end of said air inlet coupling with a seal ring set therebetween;

a socket sleeved on said control bush and having an inner thread portion at its rear end;

an air outlet coupling having an outer thread portion threadingly engaged with the inner thread portion of said socket and having a recessed portion and its inner wall surface at the front end;

a seal ring located in the air inlet coupling and operatively interposed between the air inlet coupling and the stepped control bush to prevent air from leaking through the connection between the air inlet coupling and the stepped control bush; and wherein said conical spring biases said valve to a position inside said seal ring such that said seal ring blocks said through-holes of said valve.

2. A screw-joint type pneumatic tool connector as claimed in claim 1, further comprising means enabling said air outlet coupling to be threaded further inward in said socket such that its front end is inserted in a bore of said control bush, thereby permitting its recessed portion to push said valve away rom said seal ring so that an air passage way is formed through the through-holes of said valve for compressed air to pass from said air inlet coupling through said valve, said control bush, said socket and said air outlet coupling to operate a tool.

* * * * *